United States Patent [19]

Shepherd

[11] Patent Number: 5,252,026
[45] Date of Patent: Oct. 12, 1993

[54] GAS TURBINE ENGINE NOZZLE

[75] Inventor: Andrew Shepherd, Fairfield, Ohio

[73] Assignee: General Electric Company, Cincinnati, Ohio

[21] Appl. No.: 3,338

[22] Filed: Jan. 12, 1993

[51] Int. Cl.[5] ............................................. F01D 11/02
[52] U.S. Cl. ..................................... 415/115; 415/116
[58] Field of Search ........................ 415/115, 116, 112

[56] References Cited

U.S. PATENT DOCUMENTS

| | | | |
|---|---|---|---|
| 3,791,758 | 2/1974 | Jenkinson | 415/116 |
| 4,187,054 | 2/1980 | Landis, Jr. et al. | 415/115 |
| 4,348,157 | 9/1982 | Campbell et al. | 416/95 |
| 4,353,679 | 10/1982 | Hauser | 415/115 |
| 4,447,190 | 5/1984 | Campbell | 415/115 |
| 4,522,557 | 6/1985 | Bouiller et al. | 415/116 |
| 4,627,480 | 12/1986 | Lee | 164/369 |
| 4,666,368 | 5/1987 | Hook, Jr. et al. | 415/115 |
| 4,674,955 | 6/1987 | Howe et al. | 416/95 |
| 4,702,670 | 10/1987 | Winter | 415/116 |
| 4,712,979 | 12/1987 | Finger | 416/96 R |
| 4,767,260 | 8/1988 | Clevenger et al. | 415/115 |
| 4,869,640 | 9/1989 | Schwarz et al. | 415/115 |
| 4,889,469 | 12/1989 | Wilkinson | 415/116 |
| 4,902,198 | 2/1990 | North | 415/115 |
| 4,962,640 | 10/1990 | Tobery | 415/115 |
| 5,197,852 | 3/1993 | Walker et al. | 415/115 |
| 5,197,853 | 3/1993 | Creevy et al. | 415/115 |

FOREIGN PATENT DOCUMENTS 2054046  2/1981  United Kingdom ................. 415/115

OTHER PUBLICATIONS

GE Aircraft Engineer Drawing No. 1708M52 entitled "Band, High-Pressure Turbine Nozzle-Inner, Casting", issued Apr. 18, 1991 revised through May 6, 1992 and printed May 12, 1992 (4 sheets).

*Primary Examiner*—John T. Kwon
*Attorney, Agent, or Firm*—Jerome C. Squillaro

[57] ABSTRACT

A gas turbine engine nozzle includes outer and inner bands and a plurality of spaced apart vanes extending therebetween. The inner band includes an outer surface facing the outer band over which is flowable combustion gases, and a radially inwardly facing inner surface. A plurality of circumferentially spaced apart turbulators are joined to the inner band inner surface adjacent the trailing edges of the vanes for increasing cooling of the inner band by cooling air channeled over the turbulators.

7 Claims, 3 Drawing Sheets

5,252,026

GAS TURBINE ENGINE NOZZLE

The present invention relates generally to gas turbine engines, and more specifically, to cooling of a stator nozzle therein.

BACKGROUND OF THE INVENTION

A gas turbine engine such as a turbofan engine used for powering an aircraft in flight typically includes in serial flow communication about an axial centerline axis a fan, compressor, combustor, high pressure turbine (HPT), and a low pressure turbine (LPT). Compressed air is discharged from the compressor into the combustor wherein it is mixed with fuel and ignited for generating combustion gases which flow downstream through the HPT and the LPT. The HPT is conventionally joined to the compressor and extracts energy from the combustion gases for powering the compressor. And, the LPT is conventionally joined to the fan and extracts energy from the combustion gases for powering the fan.

In order to protect engine components from the hot combustion gases, a portion of the compressed air is bled from the compressor and channeled to the components for their cooling. However, any air so bled from the compressor decreases the overall efficiency of the engine since it is not being used to generate the combustion gases from which energy is extracted by the turbines. The cooling air is discharged from the components after providing cooling thereof and rejoins the combustion gases flowing through the engine which creates additional efficiency losses due to the mixing therewith. Accordingly, it is desirable to minimize the amount of cooling air bled from the compressor for improving overall efficiency of the engine while obtaining acceptable cooling of the hot components.

Since the HPT firstly receives the combustion gases from the combustor, it is subject to the hottest combustion gas temperatures and requires suitable cooling. The HPT typically includes one or more rotor stages with a stationary nozzle disposed upstream of each rotor stage. The stage-one nozzle is disposed at the outlet of the combustor and first receives the combustion gases therefrom which are suitably channeled by the nozzle into the stage-one rotor blades. The nozzle includes radially outer and inner bands between which are fixedly joined a plurality of circumferentially spaced apart nozzle vanes. The vanes are typically hollow and provided with compressor bleed air for cooling the vanes, with another portion of the bleed air being suitably channeled to both the outer and inner bands for their cooling as well. Since the outer and inner bands extend for a substantial axial distance, they require suitable cooling along their entire axial length.

For example, the nozzle inner band typically includes a plurality of circumferentially spaced apart, conventional film cooling holes extending radially therethrough which are disposed upstream of the throats between the adjacent nozzle vanes. These film cooling holes are provided to form a cooling air film which extends downstream therefrom to the aft edge of the inner band for providing acceptable cooling thereof. The film cooling holes are provided upstream of the nozzle throats to minimize mixing losses thereof with the combustion gases flowing axially between the vanes. However, this places the film cooling holes substantially upstream from the aft edge of the inner band which requires a suitable quantity of cooling air for ensuring effective cooling from the film cooling holes axially downstream to the inner band aft edge. This configuration also typically results in overcooling of the inner band intermediate region wherein the film cooling holes discharge the cooling air, with a decreasing amount of cooling axially along the inner band to the aft edge thereof. Accordingly, axial thermal gradients are created in the inner band between the film cooling holes and the aft edge which results in undesirable thermal stress therein.

SUMMARY OF THE INVENTION

A gas turbine engine nozzle includes outer and inner bands and a plurality of spaced apart vanes extending therebetween. The inner band includes an outer surface facing the outer band over which is flowable combustion gases, and a radially inwardly facing inner surface. A plurality of circumferentially spaced apart turbulators are joined to the inner band inner surface adjacent the trailing edges of the vanes for increasing cooling of the inner band by cooling air channeled over the turbulators.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
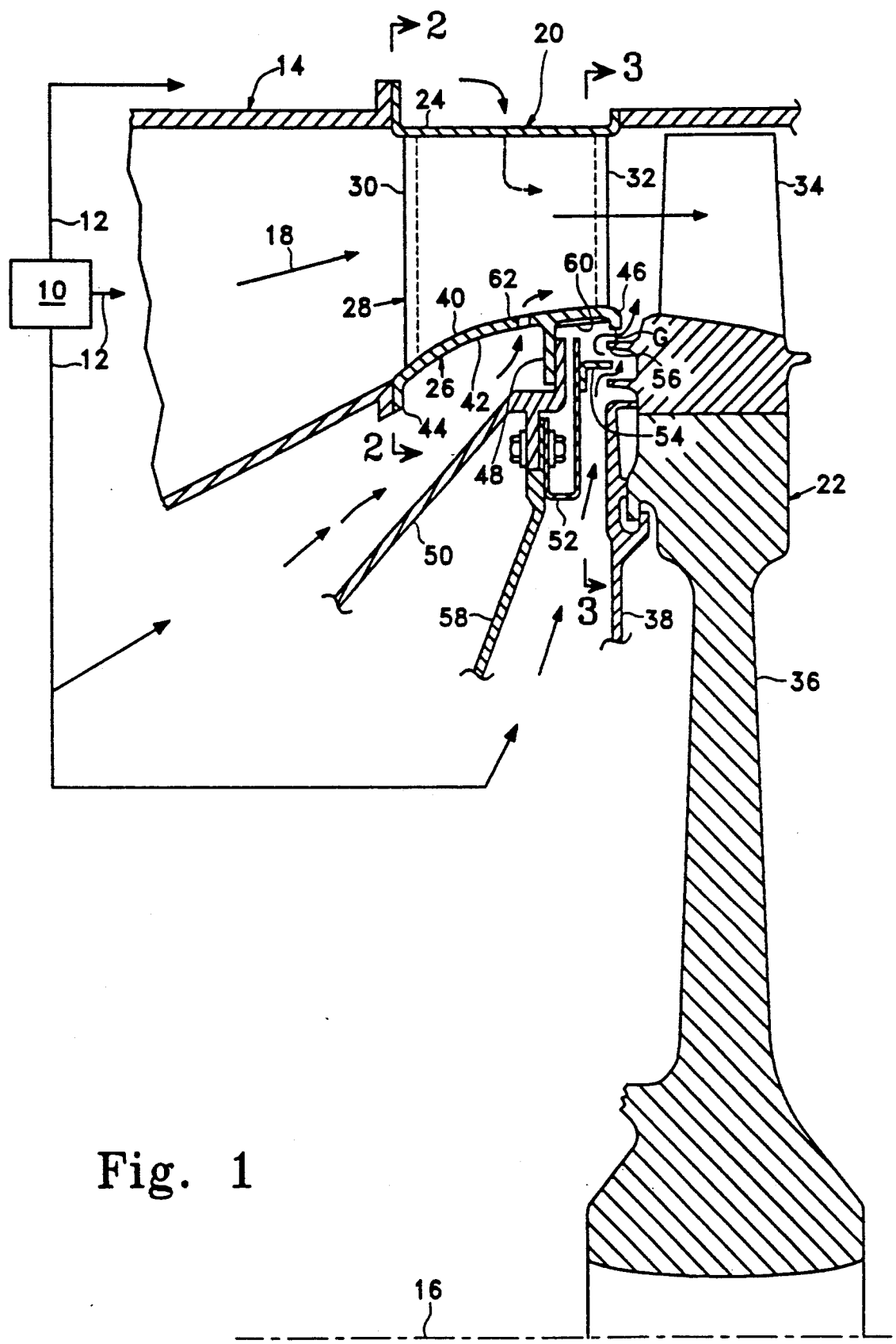
FIG. 1 is a longitudinal, partly sectional schematic view of a turbine nozzle in accordance with one embodiment of the present invention disposed between a combustor and a high pressure turbine.

Illustrated schematically in FIG. 1 is a portion of a gas turbine engine including a conventional compressor 10 effective for providing compressed air 12 to a conventional annular combustor 14 disposed coaxially about an axial centerline axis 16 of the engine. The compressed air 12 is conventionally mixed with fuel in the combustor 14 and ignited for generating combustion gases 18 which are discharged axially from the combustor 14.

A high pressure turbine (HPT) is disposed downstream of the combustor 14 and includes a first stage stationary nozzle 20 in accordance with one embodiment of the present invention which is joined to the outlet end of the combustor 14 for receiving the combustion gases 18 therefrom. Spaced axially downstream or aft of the nozzle 20 is a conventional first stage turbine rotor 22 which extracts energy from the combustion gases 18 received therefrom for rotating the turbine rotor 22 for in turn powering the compressor 10 in a conventionally known manner.

Figure 2:
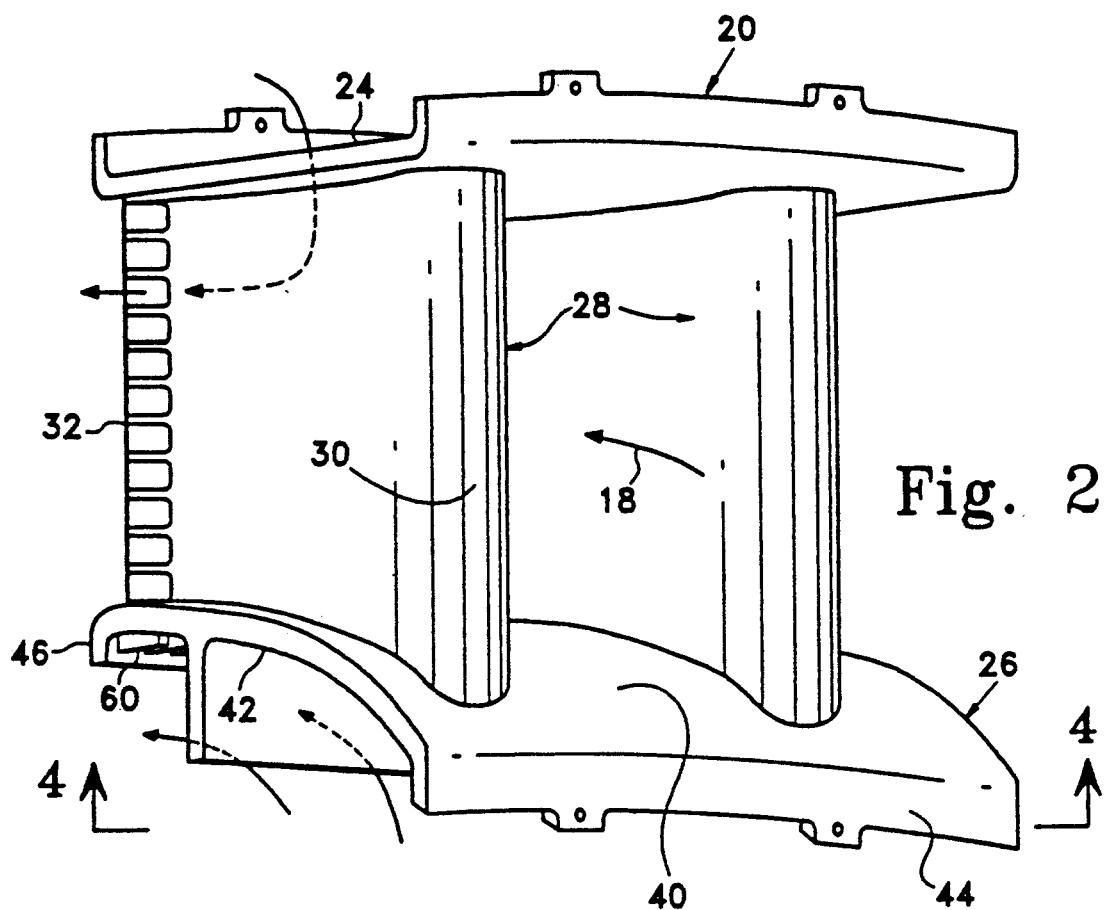
FIG. 2 is an aft facing perspective view of a portion of the turbine nozzle illustrated in FIG. 1 and taken generally along line 2—2.
Figure 3:
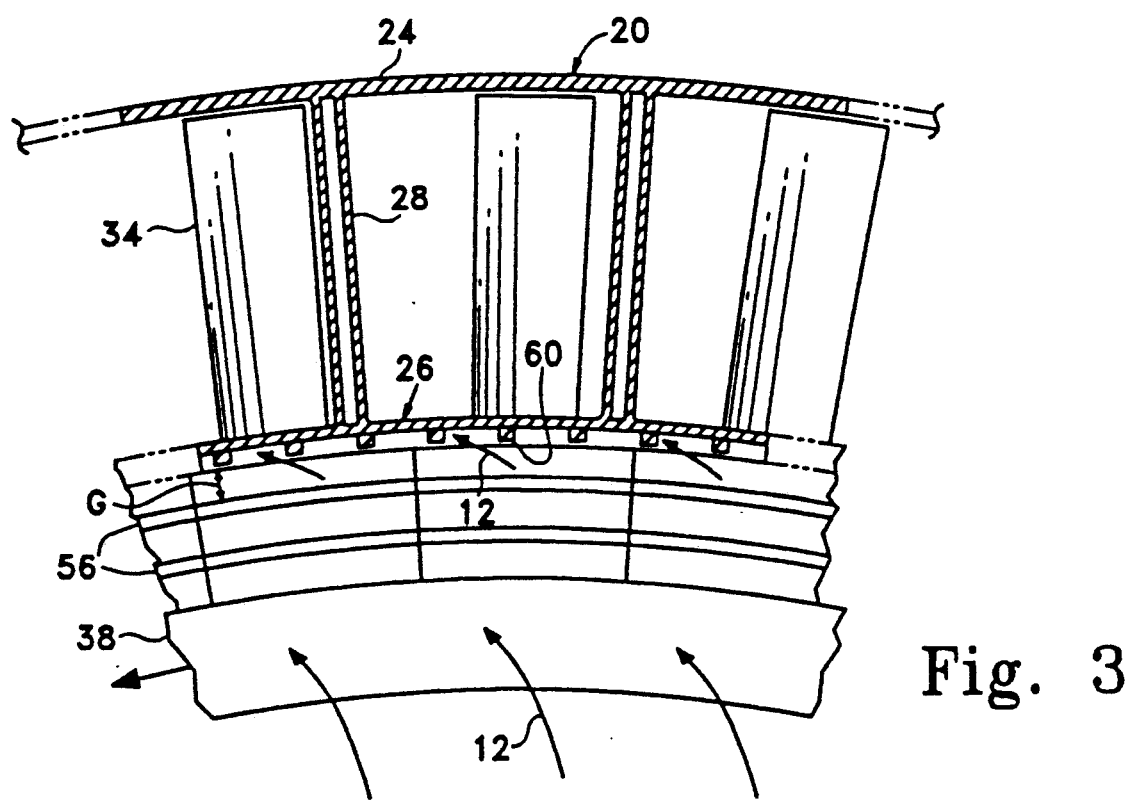
FIG. 3 is a transverse, partly sectional view through the turbine nozzle illustrated in FIG. 1 and taken along line 3—3.

As shown in FIG. 1, and in more particularity in FIGS. 2 and 3, the nozzle 20 is as annular member disposed coaxially about the centerline axis 16 and has an arcuate radially outer band 24, and an arcuate radially inner band 26 spaced radially inwardly from the outer band 24 relative to the centerline axis 16. A plurality of conventional, hollow vanes 28 are circumferentially spaced apart from each other and extended radially between the outer and inner bands 24, 26 and have opposite ends which are fixedly or integrally joined thereto. As shown in FIGS. 1 and 2, each of the vanes 28 has a leading edge 30 for first receiving the combustion gases 18, and a trailing edge 32 over which the combustion gases 18 are discharged from the nozzle 20 to the turbine rotor 22.

In the exemplary embodiment illustrated in FIG. 2, the nozzle 20 is in the form of a plurality of arcuate segments each having two vanes 26, with the adjacent nozzle segments being conventionally joined together for forming a complete, annular nozzle 20. In alternate embodiments, the nozzle 20 may include more vanes per segment, or may be a fully annular ring as is conventionally known.

The turbine rotor 22 includes a plurality of circumferentially spaced apart rotor blades 34 extending radially outwardly from an annular rotor disk 36. Each of the blades 34 is conventionally mounted to the disk 36 by axial-entry dovetails for example and is retained therein against ejection therefrom in the upstream direction by a conventional annular blade retainer 38 conventionally joined to the disk 36.

In the embodiment illustrated in FIGS. 1 and 2, the nozzle inner band 26 has a radially outer surface 40 facing radially outwardly toward the outer band 24 over which is flowable the combustion gases 18 which are bounded radially by the outer and inner bands 24, 26. The inner band 26 also includes a radially inner surface 42 facing radially inwardly toward the centerline axis 16. The inner band 26 further includes an axially forward edge 44 disposed adjacent to the vane leading edges 30 and adjacent to the outlet of the combustor 14, and an axially aft edge 46 disposed adjacent to the vane trailing edges 32 and adjacent to the turbine rotor 22. Disposed at an intermediate position spaced between the forward and aft edges 44, 46 is a radially inwardly extending annular support flange 48 which is conventionally bolted (not shown) to a conventional support cone 50. And, bolted to the support cone 50 below the support flange 48 is a conventional fairing 52 having an axially rearwardly projecting tip 54 spaced radially inwardly from the inner band aft edge 46.

The rotor blades 34 include one or more axially forwardly projecting seal wings 56, with two radially spaced apart wings 56 being shown, which cooperate with the fairing tip 54 to form a conventional labyrinth seal for restricting cooling airflow therethrough. The top wing 56 is spaced radially below the inner band aft edge 46 to define therewith a radial gap G through which the cooling air 12 which is bled from the compressor 10 is discharged axially between the vanes 32 and blades 34 for mixing with the combustion gates 18 discharged from the nozzle 20.

The cooling air 12 channeled radially upwardly between the fairing 52 and the rotor 22 is conventionally referred to as purge air which flows between the labyrinth seal defined by the fairing tip 54 and the seal wings 56 for discharge into the combustion gas flowpath between the blades 34. Conventional means in the form of the compressor 10 and suitable flowpaths including a conical forward seal wall 58 bolted at its radially outer end to the support cone 50 are provided for channeling the purge, cooling air 12 radially outwardly between the nozzle 20 and the rotor 22 for allowing the rotor 22 to impart tangential velocity to the cooling air for providing improved cooling in accordance with the present invention.

More specifically, a plurality of circumferentially spaced apart turbulators 60 as shown in FIGS. 1-3 are integrally joined to the inner band inner surface 42 adjacent the vane trailing edges 32 and face radially inwardly without obstruction for increasing heat transfer, and therefore cooling of the inner band 26 adjacent the vane trailing edges 32 by the cooling air 12 channeled tangentially over the turbulators 60 by the rotation of the turbine rotor 22. As shown in FIGS. 1 and 3, the cooling air 12 channeled radially upwardly between the wall 58 and the blade retainer 38 is caused by friction with the turbine rotor 22 to swirl in a tangential direction with increasing tangential velocity in the radially outward direction. As shown in FIG. 3, the cooling air 12 is channeled tangentially as it flows radially outwardly and around the seal wings 56 prior to discharge into the main combustion gas flowpath between the blades 34. As the cooling air 12 passes around the top seal wing 56, its tangential velocity is utilized in accordance with the present invention for flow transversely over the turbulators 60 which increases the heat transfer effectiveness of the cooling air for improved cooling of the inner band 26 adjacent its aft edge 46.

Figure 4:
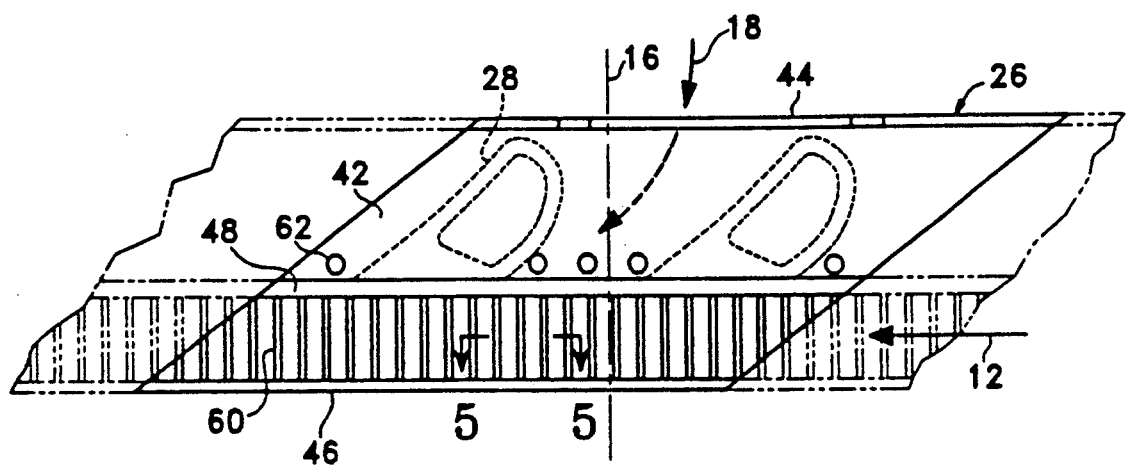
FIG. 4 is a radially outwardly facing view of the turbine nozzle illustrated in FIG. 2 taken along line 4—4 and illustrates a nozzle inner band having a plurality of turbulators.
Figure 5:
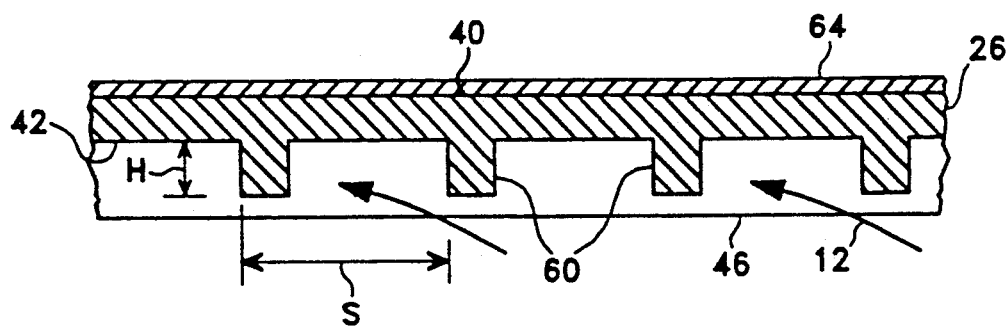
FIG. 5 is a transverse, partly sectional view of a portion of the nozzle inner band illustrated in FIG. 4 and taken along line 5—5.

As shown in more particularity in FIGS. 4 and 5, the turbulators 60 are preferably in the form of axially elongate, rectangular strips extending axially forwardly along the inner band inner surface 42 from the inner band aft edge 46, and in the preferred embodiment extend to the support flange 48. In alternate embodiments, the turbulators 60 may take any form as conventionally found in cooled rotor blades and stator vanes including pins, for example. However, in the preferred embodiment of the invention the strip turbulators 60 are preferably axially aligned with the centerline axis 16, or are substantially parallel thereto. In this way, the cooling air 12 which flows substantially tangentially or circumferentially as illustrated in FIG. 4 flows substantially perpendicularly to the strip turbulators 60, which turbulators 60 are effective for tripping the cooling air 12 for increasing cooling of the inner band 26.

As shown in FIG. 1, the cooling air 12 initially flows radially upwardly between the fairing 52 and the blade retainer 38 and then through the labyrinth seal defined by the fairing tip 54 and the seal wings 56 for flow firstly across the turbulators 60 prior to discharge from the turbulators 60 and through the radial gap G for mixing with the combustion gases 18. In this way, the tangentially directed component of the cooling air 12 not only provides its conventional purging function between the turbine nozzle 20 and the turbine rotor 22, but prior to discharge from therebetween is channeled across the inner band inner surface 42 and the turbulators 60 thereon for increasing the cooling thereof.

With more effective cooling of the inner band adjacent its aft edge 46, the axial temperature gradient therein is reduced and, the amount of film cooling air required from conventional film cooling holes 62, the aft-most row of many being shown in FIGS. 1 and 4, is reduced which improves overall efficiency of the engine. The holes 62 are conventionally located upstream of the throats between adjacent vanes 28 for reducing mixing losses of the film cooling air with the combustion gases. A portion of the cooling air 12 is conventionally provided from the compressor 10 in the radial space between the combustor 14 and the support cone 50 for feeding the film cooling holes 62.

As shown in FIG. 5, each of the turbulators 60 extends radially inwardly from the inner band inner surface 42 for a predetermined height H, and the turbulators 60 are circumferentially spaced apart from each other at a pitch spacing S, with the pitch-to-height ratio (S/H) being preferably in the range of about 5.0 to about 10.0.

Since the turbulators 60 are effective for better cooling the inner band inner surface 42, a larger temperature gradient radially through the inner band 26 at the turbulators 60 is created which, therefore, allows a conventional thermal barrier coating 64 as shown in FIG. 5 to be applied to the inner band outer surface 40 at least adjacent the turbulators 60, and preferably over the entire outer surface 40 for more effectively cooling the inner band 26. However, axial thermal gradients in the inner band 26 are reduced which correspondingly reduces thermal stresses therefrom.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine nozzle having an axial centerline axis comprising:
    a radially outer band;
    a radially inner band;
    a plurality of circumferentially spaced apart vanes having opposite ends fixedly joined to said outer and inner bands, each of said vanes having a leading edge for first receiving combustion gases, and a trailing edge over which said combustion gases are discharged from said nozzle;
    said inner band having a radially outer surface facing said outer band over which is flowable said combustion gases, a radially inner surface facing radially inwardly toward said centerline axis, a forward edge disposed adjacent to said vane leading edges, and an aft edge disposed adjacent to said vane trailing edges; and
    a plurality of circumferentially spaced apart turbulators joined to said inner band inner surface adjacent said vane trailing edges and facing radially inwardly without obstruction for increasing cooling of said inner band adjacent said vane trailing edges by cooling air channeled over said turbulators.

2. A nozzle according to claim 1 wherein said turbulators are in the form of elongate strips extending axially forwardly along said inner band inner surface from said inner band aft edge.

3. A nozzle according to claim 2 wherein said strip turbulators are axially aligned with said centerline axis.

4. A nozzle according to claim 3 in combination with:
    a turbine rotor spaced aft of said nozzle and including a plurality of circumferentially spaced apart blades extending from a disk; and
    means for channeling said cooling air radially outwardly between said nozzle and said rotor for allowing said rotor to impart tangential velocity to said cooling air for flow circumferentially over said turbulators.

5. An apparatus according to claim 4 wherein each of said rotor blades includes a seal wing extending axially forwardly and radially below said inner band aft edge to define a radial gap for channeling said cooling air firstly across said turbulators prior to discharge from said turbulators and through said gap for mixing with said combustion gases discharged from said nozzle.

6. An apparatus according to claim 5 wherein said inner band includes a radially inwardly extending support flange at an intermediate position spaced between said forward and aft edges, and said turbulators extend from said aft edge to said support flange.

7. An apparatus according to claim 3 further including a thermal barrier coating on said inner band outer surface adjacent said turbulators.

* * * * *